United States Patent Office 2,825,242
Patented Mar. 4, 1958

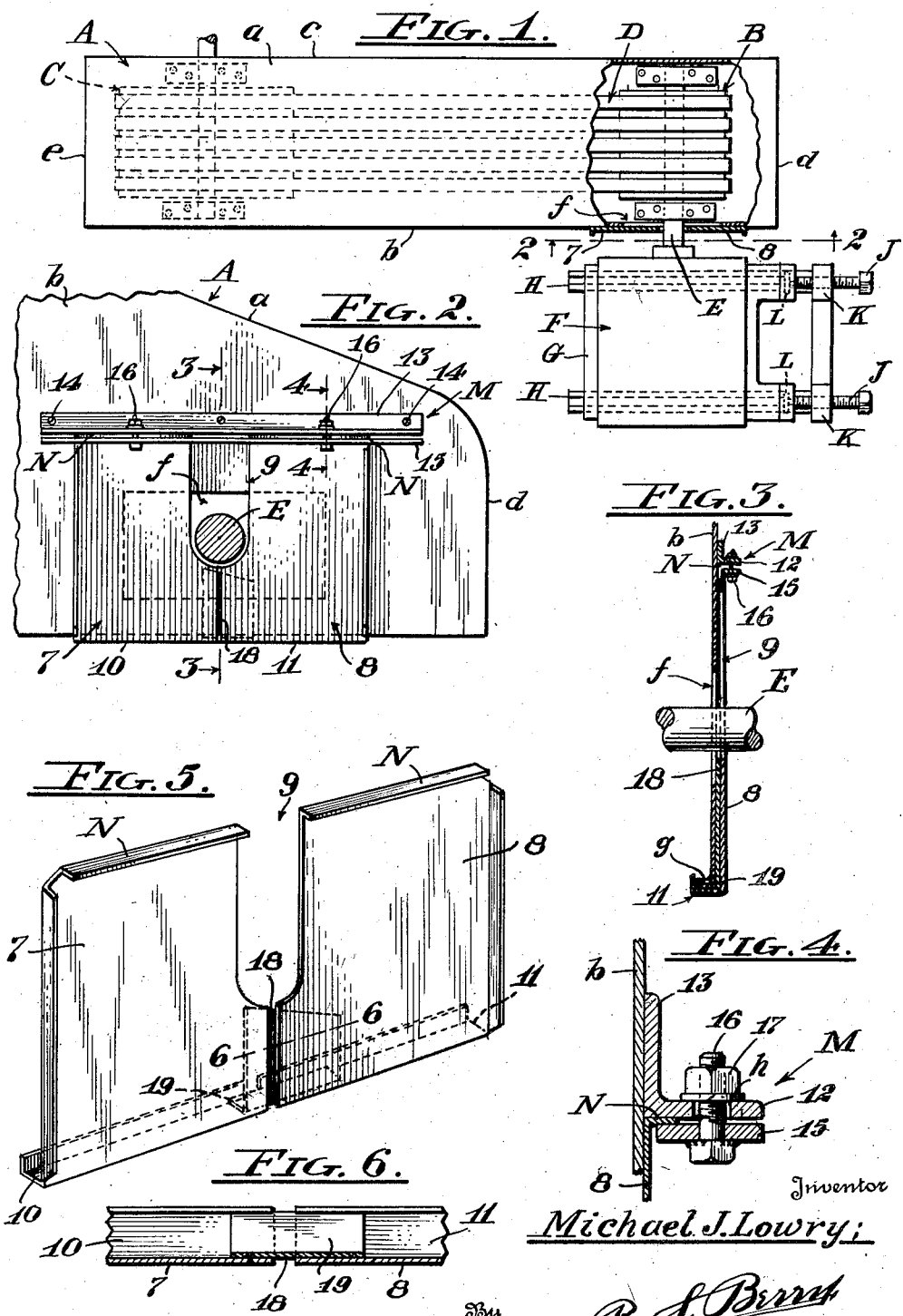

2,825,242

CLOSURE FOR THE SHAFT RECEIVING SIDE OPENING OF BELT GUARDS

Michael J. Lowry, Los Angeles, Calif.

Application April 19, 1954, Serial No. 424,026

5 Claims. (Cl. 74—611)

This invention relates to a belt guard of the type embodying a side wall formed with an aperture for the reception of a drive shaft leading from an engine or motor disposed exteriorly of the guard to a pulley interiorly of the guard and more particularly pertains to a closure for said aperture.

A primary object of the invention is to provide an effective means for at least substantially covering the shaft receiving aperture in the side wall of the housing employed as a guard for the belt and pulley assembly employed in the operation of oil well pumps.

Another object is to provide a closure for the purpose above set forth embodying a pair of slide plates arranged end to end in sliding contact with the side wall of the belt guard in overlying relation to the shaft receiving aperture and disposed astride the shaft extending through said aperture, together with effective means for mounting the slide plates for lateral adjustment on the belt guard to compensate for lateral shifting of the drive shaft as when moving the engine or motor in effecting belt tightening operations or when changing the size of the pulley carried by the shaft which necessitates shifting the shaft horizontally and accomplished by moving its motor or engine.

Another object is to provide a construction in the slide plates and the mounting therefor whereby the slide plates will be securely held in their adjusted positions and tightly secured against the belt guard against rattling and against accidental displacement yet be subject to being readily loosened for further adjustment when needed.

With the foregoing objects in view together with such other objects and advantages as may subsequently appear, the invention resides in the parts and in the combination, construction and arrangement of parts hereinafter described and claimed, and illustrated by way of example in the accompanying drawings in which:

Fig. 1 is a plan view of the belt guard with portions broken away showing the invention as applied;

Fig. 2 is a view in section and elevation taken on the line 2—2 of Fig. 1 as seen in the direction indicated by the arrows;

Fig. 3 is an enlarged vertical section taken on the line 3—3 of Fig. 2;

Fig. 4 is a detail section taken on the line 4—4 of Fig. 2 showing the slide panel supporting and clamping means;

Fig. 5 is a perspective view of the slide panel as detached;

Fig. 6 is an enlarged detail in horizontal section taken on the line 6—6 of Fig. 5 showing the telescoped interconnection of the slide panels.

Referring to the drawings more specifically A indicates generally a conventional belt guard which is shown as mounted to extend over a pulley and belt assembly embodying a drive pulley B, a driven pulley C, and a series of belts D connecting the pulleys C and B in the usual manner. The driving pulley B is mounted on a drive shaft E of an engine or motor F.

The belt guard A comprises a housing embodying a top wall $a$ inner and outer side walls $b$—$c$ and end walls $d$—$e$. The underside of the belt guard housing is open with the bottom margins of the side and end walls $b$, $c$, $d$, and $e$ straight and usually extended on a horizontal plane, but which manifestly may be inclined. The inner side wall $b$ is formed with a laterally elongated aperture $f$ through which the drive shaft E extends, the opening $f$ being elongated to permit transverse shifting of the shaft E relative to the belt guard A and the engine or motor F being mounted on a bed G supported on horizontal guide-ways H for transverse adjustment lengthwise of the belt guard. A pair of adjusting screws J threaded in fixed bosses K are connected by swivels L to the bed G for shifting the latter on the guide-ways H in the conventional fashion.

In carrying out the present invention a pair of slide panels 7 and 8 are provided to cover the opening $f$, the slide panels being arranged end to end in longitudinal alignment on opposite sides of the drive shaft E; the panels 7—8 being formed with an open ended slot 9 to receive the shaft E, the slot extending downwardly from the upper margin of the panels and terminating in spaced relation to the lower margins of the panels.

The panels 7—8 are designed to slidably engage the lower margin of the side wall $b$ which latter is formed with a narrow inturned flange $g$ and for which purpose the panels 7—8 are formed on their lower margins with inwardly and upwardly extending flanges 10 and 11 forming channels which are adapted to receive the flange $g$ as particularly shown in Fig. 3.

The slide panels 7—8 are slidably supported for longitudinal adjustment on the wall $b$ by means of a clamp M as particularly shown in Fig. 4, which clamp embodies a rail 12 comprising one web of an angle iron the other web 13 of which is rigidly fastened to the wall $b$ as by bolts 14 or other fastening means. The rail 12 extends above the opening $f$ in spaced relation thereto and with the rail arranged parallel with the flanged lower margin of the wall $b$. The upper margins of the panels 7—8 are formed with out-turned flanges N which are designed to abut the under side of the rail 12 and to be engaged by a clamping bar 15 formed of flat bar stock which underlies and is substantially co-extensive with the rail 12. The bar 15 is secured to the rail 12 by bolts 16 which are fixed on the bar 15 and are passed through openings $h$ in the rail 12 and engaged by clamping nuts 17 which on being tightened on the nuts 16 draw the bar 15 tightly against the flange N thereby securely clamping the slide plates in fixed relation to the wall $b$ but subject to being shifted longitudinally relative to the wall $b$ on loosening the nuts 17 to allow the bar 15 to lower sufficiently to permit sliding movement of the flange N thereon.

The slide plates 7—8 are preferably interconnected at their adjacent inner ends for which purpose a web 18 is affixed to the inner face of the panel 7 to project beyond the inner marginal portion of the panel 7 below the slot 9 in overlapping relation with the inner face of the panel 8, the web 18 being formed with an inturned flange 19 on its lower margin which seats on the flanges 10 and 11 and conforms to the width of the channel formed by said flanges thereby effecting a slidable telescopic connection between the lower portions of the pair of panels 7—8.

In the application and operation of the invention the slide panels 7—8 are positioned on the belt guard A by advancing them upwardly over the outer face of the wall $b$ from the lower margin of the latter with the panels advancing astride the shaft E; the panels being thus advanced until the flanged lower margins thereof engage the flanged lower margin of the wall *b*. The panels 7—8 are of such height that when thus positioned the flanges N on the upper margins thereof will abut the underside of the rail 12 which obviously is spaced from the lower margin of the wall *b* a distance substantially corresponding to the height of the panels 7—8. On the panels being thus disposed the clamping bar 15 is applied to the underside of the rail 12 and clamped in engagement with the panel flanges N by the bolt and nut assembly 16—17. The panels 7—8 will then overlie the aperture *f* so as to close the latter except as to a small portion extending above the shaft E.

In event it becomes necessary to shift the shaft E laterally the clamping bar 15 is loosened as before described whereupon the required adjustment of the shaft is effected as by manipulating the screws J. Lateral movement of the shaft E will effect corresponding movement of whichever of the panels 7—8 is abutted by the shaft D and where the telescopic connection between the panels 7—8 afforded by the webs 17—18 is sufficiently tight the panels will collectively move under the thrust of the shaft E. However if it is necessary either or both the panels 7—8 may be manually shifted longitudinally to the desired position.

On effecting the required adjustment of the slide panels the nuts 17 are tightened on the bolts 16 so as to clamp bar 15 against the flange N, thereby securely fastening the slide panels in position against accidental displacement.

The panels 7—8 are generally formed of sheet metal such as galvanized iron and are dimensioned and fabricated according to various requirements. While the slide panels and their supporting clamp structure are applicable to new belt guards in the production of the latter they are capable of being fabricated for application to old belt guards either before or after their installation in the field since the clamping rail 12—13 may be readily fastened to the side wall of the belt guard as by bolts, screws or by welding.

While a specific embodiment of the invention has been shown and described, the invention is not limited to the exact details of construction set forth, and the invention embraces such changes, modifications and equivalents of the parts and their formation and arrangement as come within the purview of the appended claims.

I claim:

1. In combination with a belt guard housing having a side wall formed with a shaft receiving aperture, a pair of slide panels extending in longitudinal alignment over said aperture having adjacent ends positioned to extend on opposite sides of a shaft projecting through said aperture, said panels having upper margins, out-turned flanges on said margins, and adjustable clamping means on said side wall engaging said flanges collectively holding said panels in releasable fixed relation to each other.

2. In combination with a belt guard housing having a side wall formed with a shaft receiving aperture, a horizontally extending rail fixed on said side wall above said aperture, a pair of slide panels extending in longitudinal alignment over said aperture having adjacent ends positioned to extend on opposite sides of a shaft projecting through said aperture; said panels having upper margins, out-turned flanges on said margins underlying said rail, a clamping bar underlying said flanges, and releasable means fastening said bar and rail together in fixed gripping engagement with said flanges to collectively fasten said panels against relative movement.

3. A closure for the shaft receiving aperture of a belt guard housing comprising a pair of slide panels arranged end to end having portions of their contiguous ends telescopically connected and formed with an open ended shaft receiving slot extending between said contiguous ends above said connected portion, out-turned flanges on the upper margins of said panel, a clamping rail adapted to be mounted on the belt guard housing, and releasable means fixedly clamping said flange against said rail.

4. The structure called for in claim 3 in which the clamping means comprises a bar for underlying said flanges, and a nut and bolt assembly connecting said bar and rail for clamping said flanges therebetween.

5. In a belt guard housing having a side wall formed with a shaft receiving aperture, a pair of longitudinally aligned slide plates extending over said aperture having an open ended shaft receiving slot between adjacent ends thereof and being telescopically connected below said slot, means slidably connecting the upper and lower margins of said slide plate to said guard side wall, and means for collectively fixedly clamping said plates at their upper margins to said side wall in various positions longitudinally thereof.

References Cited in the file of this patent

UNITED STATES PATENTS

| 1,282,376 | Cabelinsky | Oct. 22, 1918 |
| 1,301,947 | Judelshon | Apr. 29, 1919 |

FOREIGN PATENTS

| 17,799 | Great Britain | July 29, 1897 |
| 19,990 | Great Britain | Sept. 10, 1896 |
| 23,285 | Great Britain | Sept. 5, 1895 |